(12) United States Patent  (10) Patent No.: US 8,528,076 B2
Lin  (45) Date of Patent: Sep. 3, 2013

(54) METHOD AND APPARATUS FOR AUTHENTICATING ONLINE TRANSACTIONS USING A BROWSER AND A SECURE CHANNEL WITH AN AUTHENTICATION SERVER

(75) Inventor: Paul Y. Lin, Fremont, CA (US)

(73) Assignee: F2Ware, Inc., Mountain View, CA (US)

( * ) Notice: Subject to any disclaimer, the term of this patent is extended or adjusted under 35 U.S.C. 154(b) by 0 days.

(21) Appl. No.: 13/358,160

(22) Filed: Jan. 25, 2012

(65) Prior Publication Data

US 2012/0131332 A1    May 24, 2012

Related U.S. Application Data

(62) Division of application No. 12/641,156, filed on Dec. 17, 2009, now Pat. No. 8,245,030.

(60) Provisional application No. 61/139,527, filed on Dec. 19, 2008.

(51) Int. Cl.
*H04L 29/06* (2006.01)

(52) U.S. Cl.
USPC .............................................. 726/21; 726/3

(58) Field of Classification Search
None
See application file for complete search history.

(56) References Cited

U.S. PATENT DOCUMENTS

| 7,720,997 | B1 * | 5/2010 | Gourlay et al. | 709/245 |
|---|---|---|---|---|
| 8,065,417 | B1 * | 11/2011 | Richardson et al. | 709/226 |
| 8,074,259 | B1 * | 12/2011 | Levy et al. | 726/2 |
| 2002/0138561 | A1 * | 9/2002 | Chatfield et al. | 709/203 |
| 2004/0003287 | A1 * | 1/2004 | Zissimopoulos et al. | 713/201 |
| 2008/0166994 | A1 * | 7/2008 | Ku et al. | 455/406 |
| 2010/0095208 | A1 * | 4/2010 | White et al. | 715/704 |

* cited by examiner

*Primary Examiner* — Hadi Armouche
(74) *Attorney, Agent, or Firm* — McClure, Qualey & Rodack, LLP

(57) ABSTRACT

A computer-implemented method for authenticating a user using a service provider server and an authentication server, the user communicating with at least one of the service provider server and the authentication server using a user browser. The method includes requesting, using the user browser, the authenticating with the service provider server. The method also includes authenticating, using the user browser, a secure communication channel with the authentication server. The method also includes receiving, using the user browser, a Next Pre-Authentication Anchor (NPAA) value from the authentication server. The method additionally includes temporarily storing the Next Pre-Authentication Anchor (NPAA) value in a user browser cookie associated with the user browser, wherein the Next Pre-Authentication Anchor (NPAA) value is protected by employing Same Origin Policy (SOP).

8 Claims, 5 Drawing Sheets

METHOD AND APPARATUS FOR AUTHENTICATING ONLINE TRANSACTIONS USING A BROWSER AND A SECURE CHANNEL WITH AN AUTHENTICATION SERVER

PRIORITY CLAIM

This application is a divisional of co-pending application Ser. No. 12/641,156, filed Dec. 17, 2009, which claims priority under 35 USC 119(e) to an earlier filed provisional patent application entitled "METHOD AND APPARATUS FOR AUTHENTICATING ONLINE TRANSACTIONS USING A BROWSER", Filed Dec. 19, 2008, Application No. 61/139,527, which is incorporated by reference in its entirety herein.

BACKGROUND OF THE INVENTION

Online transactions, including financial transactions and other confidential transactions, have long been employed to allow two parties to conduct business. In a typical online transaction, the user (such as, for example, a bank customer) uses a client browser on a computer to established a session with an application server (such as, for example, the banking server that is operated by the bank) and accomplishes the desired transaction (such as, for example, transferring money from one account to another account). Since online transactions are often conducted via the Internet, which is a global public network of routers, servers, trunks, etc., security is always a paramount concern.

Risks to online transaction security include risks that an unauthorized third party may be able to obtain the authentication information (such as userid and password) and may be able to subsequently conduct fraudulent transactions to the detriment of the user. For example, if only a userid and password are required to log into a bank from any computer, a third party with access the user's userid and password would be able to log in from anywhere and perform any transaction that the user is able to perform, including for example transferring money to an account under control by the unauthorized third party.

The stealing of userid and password may be accomplished by techniques such as Trojans (generically referring to client-resident applications that snoop the userid and password as they are typed in by the user and relay the userid and password to the fraudster). Another technique involves phishing. In an example phishing scenario, the user may receive an email with a message requesting the user to log into a website purported to belong to a merchant with whom the user has previously done business (e.g., XYZ Bank). The email contains a link to be activated by the user. If the user activates the link that is provided with the phishing email, the user is presented with a website that has a substantially identical look-and-feel to that of the real website (e.g., XYZ Bank). However, this website actually belongs to the fraudster. Information entered by the user into the fraudster's website, which mimics the look-and-feel of the real website, would be recorded and used to subsequently perpetrate fraud on the user. By way of example, the fraudster may employ the entered userid and password to log into the account of the user and perform an unauthorized transfer of money.

Pharming is another type of attack that has been employed to practice frauds on users. In pharming, the DNS (Domain Name System) table is poisoned so that when the user types in the URL associated with the service provider, that URL would be translated into an IP address associated with the attacking pharming website. The user is then taken to the attacking pharming website, which may attempt to mimic the service provider website in order to obtain the login credentials of the users. Once the login credentials are acquired, fraudsters may subsequently use those login credentials to practice frauds on users, such as to fraudulently withdraw money from the user's bank account.

The aforementioned touches only on some broad categories of online transaction risks. There are other risks currently existing and they are well known and will not be belabored here. Further, techniques are continually developed to combat online fraud. In response, the fraudsters continually develop techniques to defeat the newly implemented security measures, including authentication schemes.

One method of combating frauds such as Trojans, phishing, or pharming involves using second factor authentication, wherein additional information is required for authentication. With the userid/password acting as the first authenticating factor, the application server (e.g., the bank application), also requires additional authentication based on hardware that is possessed by the device being used for access or by the user. For example, a hardware token or ATM card may be required for the second factor authentication.

However, hardware second factor authentication is both expensive to implement for the service provider and cumbersome for the user.

In view of the transaction risks that are currently existing and/or that are being developed in response to security measures, improved authentication techniques are desired.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
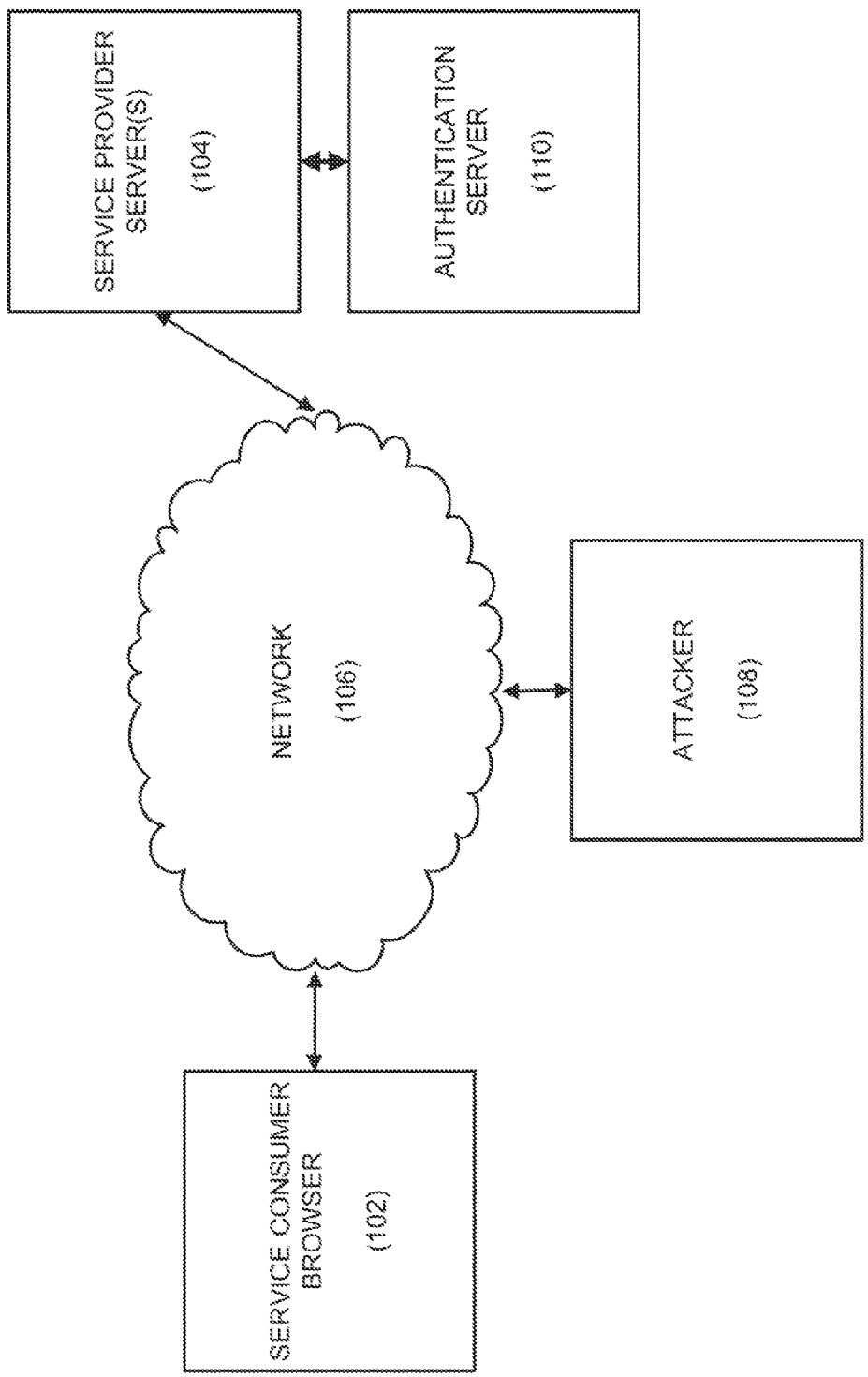
FIG. 1 shows, in accordance with an embodiment of the invention, a simplified network topology including a service consumer browser, representing the browser through which a service consumer (such as a bank customer, for example) may access the services offered by a service provider server associated with the service provider (such as the bank, for example).

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Embodiments of the invention pertain to techniques for employing the browser, and more particularly cookies in browsers, to exchange, store and generate second authentication factors (which may be used for authentication in addition to first authentication factor such as userid and password). By using the service consumer browser to serve as an anchor to generate second factor credentials, no cumbersome or expensive hardware solutions are required. Embodiments of the invention employ the Same Origin Policy (SOP) nature of browser cookies to implement aspects of the inventive authentication to prove authenticity of the service consumer and the device with which the service consumer employs to access the services offered by the service provider server.

To elaborate, SOP specifies that a cookie may have attributes that couple or associate that cookie with a particular domain name. Thus, a cookie associated with a server having the domain name xxx.example1.xyz will not be accessible by another server having a different domain name for example. Embodiments of the invention improves upon the use of SOP to protect the authentication data values in cookies.

To combat pharming risks, certain required authentication value(s) are associated with the IP address of the service provider server instead of with the URL of the service provider server. In this manner, only servers with the same IP address as the service provider server may access the required authentication value(s). Thus, even if the service consumer is directed to an attacking pharming website, authentication would fail since the attacking pharming website does not have the same IP address as the service provider server.

Also, to combat phishing risks, a secure identifier (referred to herein as an "activation code") is utilized during a one-time user setup of the service consumer for authentication. An activation code is a randomly-generated identifier (e.g., numbers, alpha-numeric strings, etc.). An activation code can have added any sort of digital signatures and tests to distinguish human users from "computers" or "computer programs". One skilled in the art will appreciate that even though a digital signature has not been described in detail below, the usage of this technique as well as combining the technique with other techniques for data obfuscation falls within the scope of the present invention.

Furthermore, embodiments of the invention employ a challenge-response paradigm to establish a shared secret between the service consumer browser and the authentication server. The shared secret enables the establishment of a secure channel between the service consumer browser and the authentication server. Using the challenge-response paradigm and shared secret stored in the SOP-protected cookie, embodiments of the invention enable a browser to store, generate, and transmit credentials for the purpose of authentication.

FIG. 1 shows, in accordance with an embodiment of the invention, a simplified network topology including a service consumer browser 102, representing the browser through which a service consumer (such as a bank customer, for example) may access the services offered by a service provider server 104 associated with the service provider (such as the bank, for example). Network 106 represents the computer network (such as the internet, for example) that interconnects the computer executing service consumer browser 102 with service provider server 104. In the examples herein, it is assumed that network 106 is an untrusted public network and vulnerable to exploits by attackers (such as attacker 108).

To ensure that the service consumer (e.g., bank customer) is properly authenticated before allowing transactions to proceed between the service consumer and the service provider (e.g., bank), an authentication server 110 is employed. Authentication is accomplished by first performing a one-time user setup of the service consumer for authentication. The one-time user setup provisions a cookie or cookies in the service consumer browser with specific values for authentication purposes and associates a specific consumer/specific computer with a specific authentication profile in the authentication server. The setup process will be discussed in greater detail later herein in connection with FIG. 3.

Once the one-time user setup is completed, authentication may be performed by authentication server 110 for each session between the service consumer browser 102 and the service provider server 104. The values setup in the cookie in service consumer browser 102 and the values setup for the specific user/specific computer profile in authentication server 110 during the one-time user setup facilitate the authentication process during run time (i.e., when the consumer accesses the service provider server to attempt to conduct a transaction with the service provider, and authentication is performed prior to the transaction occurring). Generally speaking, authentication involves pre-authentication, mutual authentication, and post-authentication sub-processes. The authentication process, including the three aforementioned sub-processes, will be discussed in greater detail later herein in connection with FIGS. 4-5.

Figure 2:
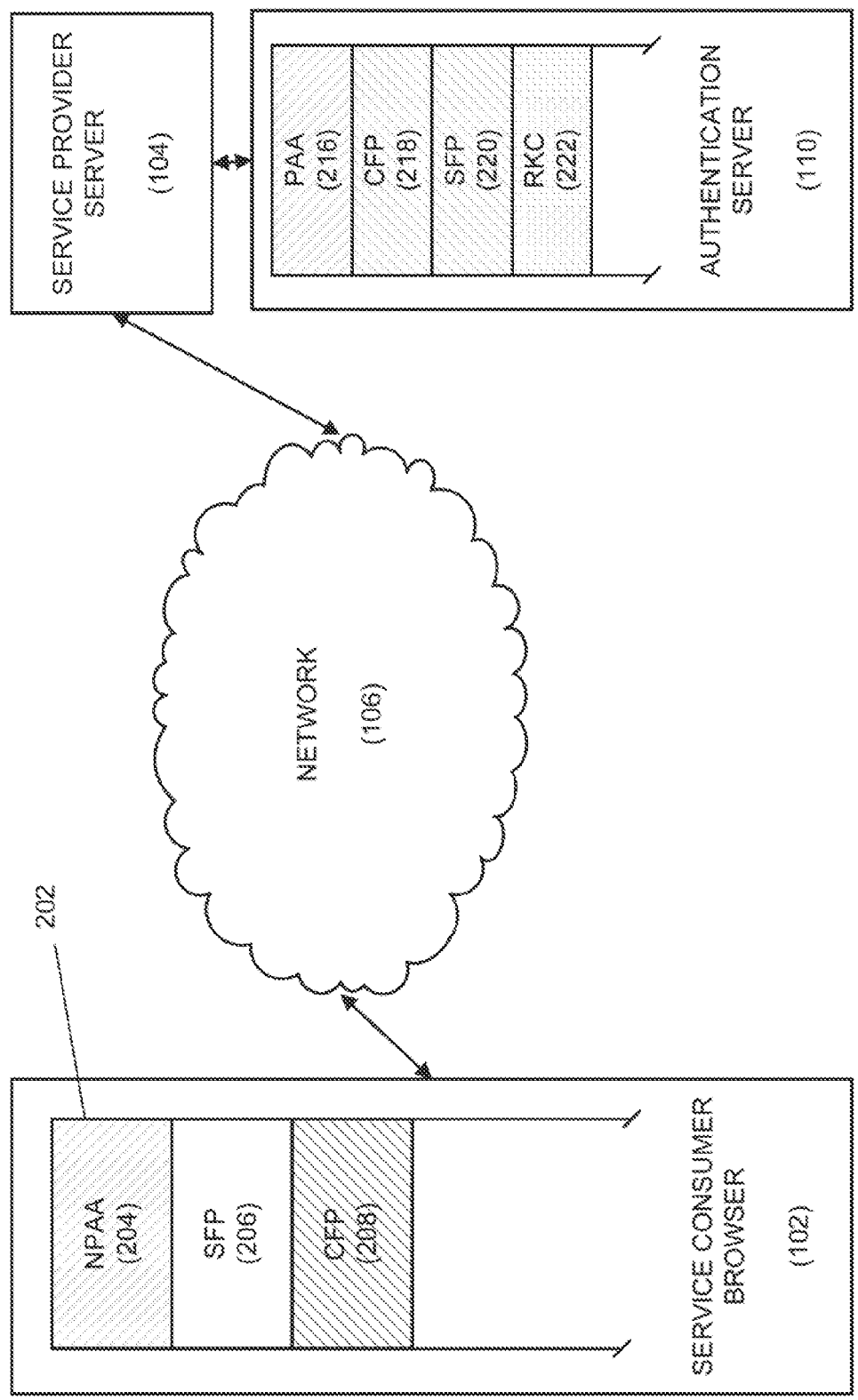
FIG. 2 shows, in accordance with an embodiment of the invention, the topology representation of FIG. 1 in greater detail.

FIG. 2 shows, in accordance with an embodiment of the invention, the topology representation of FIG. 1 in greater detail. In FIG. 2, service consumer browser 102, network 106, service provider server 104, and authentication server 110 are again shown. Within service consumer browser 102, there is shown a cookie 202 for storing authentication-related data of the type that facilitates authentication by authentication server 110 prior to permitting access by service consumer browser 102 to the services provided by service provider server 104.

Cookie 202 includes at least three values: a Next Pre-Authentication Anchor (NPAA) value 204, a Server Fingerprint (SPF) 206, and a Client Fingerprint (CFP) 208. NPAA is advantageously associated with and the IP address of service provider server 104 and thus accessible only by a server having the IP address of the service provider server 104 (which IP address is made known to service customer browser 102 during the aforementioned one-time setup). One skilled in the art will recognize that by associating the NPAA with the IP address of the service provider server instead of with the domain name of the service provider server, it is not possible for another server (such as an attacking server that connects to service client browser 102 via pharming) to access the content of the NPAA. Thus, even if DNS poisoning occurs and customer service browser 102 is directed by a DNS server to an attacker server other than the intended service provider server 104, authentication with this attacker server is not possible due to the fact that the attacker server will have a different IP address and thus will not be able to access cookie 202 and more particularly the NPAA value 204 of cookie 202. NPAA value 204 of cookie 202 is encrypted by a key known only to authentication server 110.

Server Fingerprint (SFP) 206 is associated with the FQDN (Fully Qualified Domain Name) of service provider server 104. CFP (Client Fingerprint) 208 is also associated with the FQDN (Fully Qualified Domain Name) of service provider server 104. CFP 208 is encrypted with the Rolling Key (RK).

Authentication server 110 includes at least four values for authenticating, during runtime, with the specific user/specific user computer combination that is involved during the one-time setup. In other words, values stored in these four fields in the authentication server 110 will, upon authentication success, allows only the specific user/specific user computer combination that is involved during the one-time setup to access the services offered by service provider server 104.

As can be seen in FIG. 2, authentication server 110 includes a Pre-Authentication Anchor (PAA) value 216, a Client Fingerprint (CFP) 218, a Server Fingerprint (SFP) 220, and a Rolling Key Challenge (RKC) 222. Generally speaking, the PAA 216 is encrypted with the same key employed to encrypt NPAA 204. On the other hand, CFP 218, SFP 220, and RKC 222 are encrypted with a system-generated key for the specific user/specific user computer combination. The generation and provisioning of these values (i.e., PAA 216, CFP 218, SFP 220, and RKC 222) during the one-time setup process and during run-time authentication will be discussed later herein in connection with FIGS. 3, 4, and 5.

Figure 3:
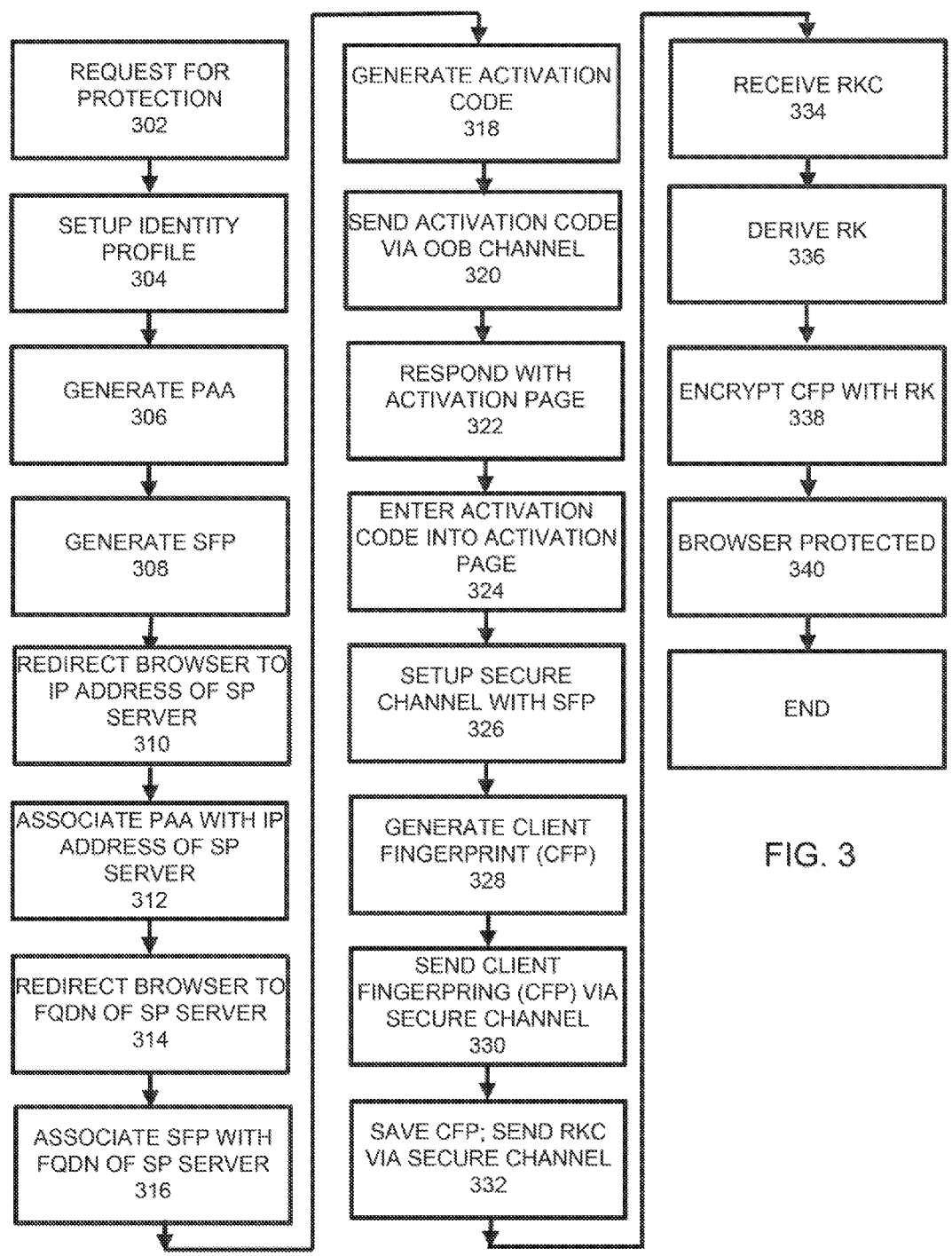
FIG. 3 shows, in accordance with an embodiment of the invention, the steps involved in registration, i.e., setting up a new service consumer or an existing service consumer on a new computer for subsequent authentication during runtime.

FIG. 3 shows, in accordance with an embodiment of the invention, the steps involved in registration, i.e., setting up a new service consumer or an existing service consumer on a new computer for subsequent authentication during runtime. During registration, certain values are stored in the secure cookie of the service consumer browser and in the authentication server for the particular user/device. Further, the shared secret is transferred from the authentication server to the service consumer browser and the client fingerprint (CFP) is transferred from the service consumer browser to the authentication server during registration.

In step 302, a request for protection is indicated by the service consumer's browser. Generally speaking, the request for protection is indicated when the service consumer attempts to access services provided by the service provider server and the service provider server and/or authentication server cannot authenticate the user or specific user/specific computer combination as having been set up previously for authentication.

In step 304, service provider server obtains the identity profile for the new authentication set-up requestor from the service consumer and provides the identity profile to the authentication server.

In step 306, the authentication server generates PAA (Pre-Authentication Anchor) 216 for the specific user/specific computer (which may be identified by userid and client browser IP address or any other unique identifier for the specific user and the specific computer making the request, for example). In an example, PAA 216 is generated from the unique customer ID, a time stamp and a random seed number. In step 308, the authentication server generates SFP (Server Fingerprint) 220 for the specific user/specific computer. In an example, SFP 220 is generated from the unique customer ID, a time stamp and a random seed number.

In step 310, redirect the service consumer browser 102 to the IP address of the service provider server 104. In step 312, associate the PAA with the IP address of the service provider server 104. In step 314, redirect the service consumer browser 102 to the FQDN of the service provider server 104. In step 316, associate the server fingerprint (SFP) with the FQDN of the service provider server 104.

In step 318, authentication server 110 generates an activation code, which is transmitted (320) to the service consumer himself using an out-of-band communication channel. For example, the activation code may be sent via an email, a SMS, a private message, an instant message, or a phone call. Out-of-band activation code transmission substantially reduces the risk of fraud.

In step 322, the service provider server responds to the setup request from the service consumer browser with an activation webpage to enable the service consumer to enter the received out-of-band activation code.

In step 324, the service consumer responds to the webpage that requests the activation code with the activation code that was received out-of-band. The activation code will be employed by the service consumer browser to verify the SFP.

In step 326, a secure channel is set up between service consumer browser 102 and service provider server 104. Generally speaking, the secure channel is an encrypted channel that is encrypted using a challenge-response paradigm. In an embodiment, service consumer browser 102 generates a challenge seed from, for example, a random number. Using this randomly generated challenge seed, service consumer browser 102 then encodes the key based on the SFP. The encoded key is then employed to encrypt data to be transmitted to service provider server 104. The data to be encrypted and transmitted may include, for example, a known fact. The challenge itself may be in plain text. Service provider server 104 may then generate a response to the challenge. The response is employed to decrypt the received packets to obtain the known fact. The known fact may then be compared against what is known by the authentication server. If the known facts match, a secure channel is deemed setup and future communication and encryption may proceed in the same manner.

In step 328, service consumer browser 102 generates the client fingerprint (CFP) from, for example, a random number seed. This CFP is then transmitted (330) to the service provider server 104 via the secure channel. The CFP is then provided from the service provider server 104 to authentication server 110, which stores the CFP (332). Authentication server 110 then sends (332) a rolling key challenge (RKC) to service consumer browser 102 via the secure channel. Service consumer browser 102 receives (step 334) the rolling key challenge (RKC) and derives the rolling key (RK) from the RKC (step 336).

In step 338, the CFP in the cookie of service consumer browser 102 is encrypted with the rolling key derived in step 336. At this point, the service consumer browser 102 is considered setup and protected (340).

Figure 4:
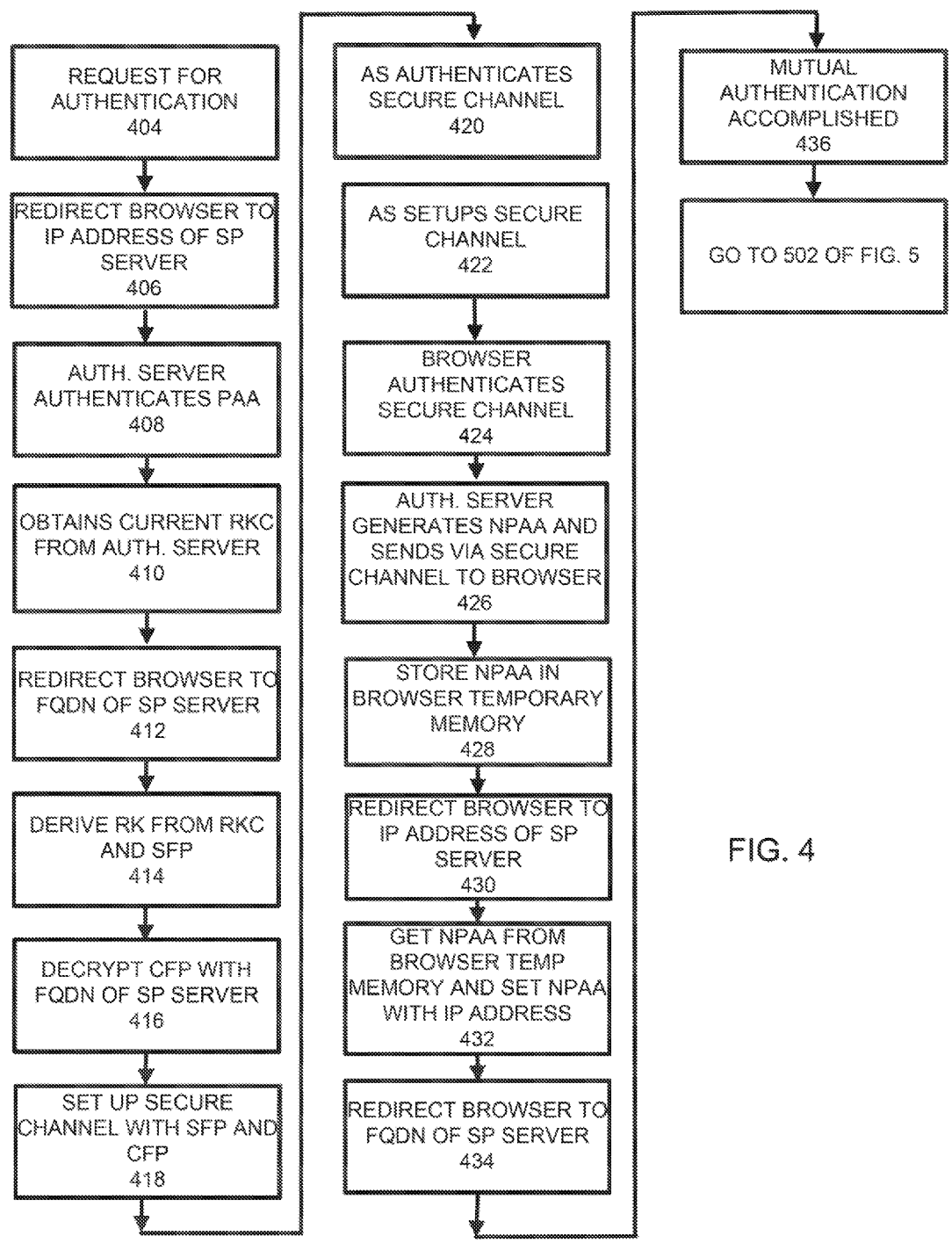
FIG. 4 shows, in accordance with an embodiment of the present invention, the steps for authenticating a service consumer.

FIG. 4 shows, in accordance with an embodiment of the present invention, the steps for authenticating a service consumer. The steps of FIG. 4 are performed during run time each time authentication is required (such as before the start of a session between the service consumer and the service provider). In contrast, the steps of FIG. 3 are performed only once for each new service consumer or each time an existing service consumer employs a new computer to access the service provider website.

Generally speaking, steps 404-408 relate to pre-authentication. Steps 410-438 relate to mutual authentication. Steps 502-512 of FIG. 5 relate to post-authentication.

In step 404, the service consumer browser 102 requests authentication with the service provider. The request may be implicit as part of accessing the service provider server, for example.

In step 406, redirect service consumer browser 102 to the IP address of service provider 104. The purpose of the redirect is to provide the IP address of the service provider server 104 to service consumer browser 102 and authentication server 110.

Note that the IP address of the service provider server is obtained session-by-session. In other words, the IP address of the service provider server is not statically obtained during the one-time setup process and stored as a fixed value in the cookie. In this manner, even if the server moves in between sessions and the service provider server now has a different IP address, authentication is still possible as discussed hereinbelow.

In step 408, authentication server 110 authenticates the PAA received from service consumer browser 102.

In step 410, the service consumer browser 102 obtains the current rolling key challenge (RKC) from the authentication server. In step 412, redirect service consumer browser 102 to FQDN of service provider server 104.

In step 414, service consumer browser 102 derives the rolling key from the rolling key challenge received in step 410 and from the server fingerprint (SFP). The rolling key (RK) derived in step 414 is employed to decrypt the client fingerprint (CFP) (step 416). Also in step 416, the decrypted CFP is associated with the fully qualified domain name (FQDN) of the service provider server to render this CFP accessible only to the server having the FQDN of the service provider server (e.g., www.abcbank.com).

In step 418, service consumer browser 102 sets up a secure communication channel with authentication server 110 using the secure communication channel setup technique discussed earlier. In step 420, authentication server 110 authenticates the secure channel. In step 422, authentication server 110 in turn sets up a secure channel with service consumer browser 102 (via service provider server). In step 424, service consumer browser 102 authenticates the secure channel.

In step 426, authentication server 110 generates NPAA and sends via secure channel to service consumer browser 102. This next pre-authentication anchor (NPAA) represents the pre-authentication anchor (PAA) employed in the next communication session by the service consumer browser 102. In this manner, the pre-authentication anchor changes with every session to render it more difficult for a third party to sign in without having the correct PAA, which changes with every session.

In step 428, the NPAA is temporarily stored in the service consumer browser's temporary memory.

In step 430, redirect service consumer browser 102 to IP address of service provider server 104. This redirect allows the service consumer browser to obtain the IP address of the service provider server.

In step 432, the service consumer browser gets the NPAA from the browser's temporary memory and sets the NPAA value to the IP address of the service provider server, thereby rendering the NPAA accessible only to the website having the IP address of the service provider server. In this manner, even if a pharming attack is attempted, authentication would fail since the PAA in the new session would not be accessible by the attacking pharming website. Note that at no time is the cookie that has the NPAA associated with the IP address of the service provider server exposed to or transmitted on the network. Further, the service provider server is expressly configured to not request the service consumer browser to forward the cookie that associates the NPAA with the IP address of the service provider server.

In step 434, redirect service consumer browser 102 to FQDN of service provider server 104. As can be appreciated from the foregoing, the NPAA is furnished to the service consumer browser without exposing the cookie that associates the NPAA with the IP address of the service provider server to the network.

Once both service consumer browser 102 and authentication server 110 authenticate, mutual authentication is deemed completed (436).

Figure 5:
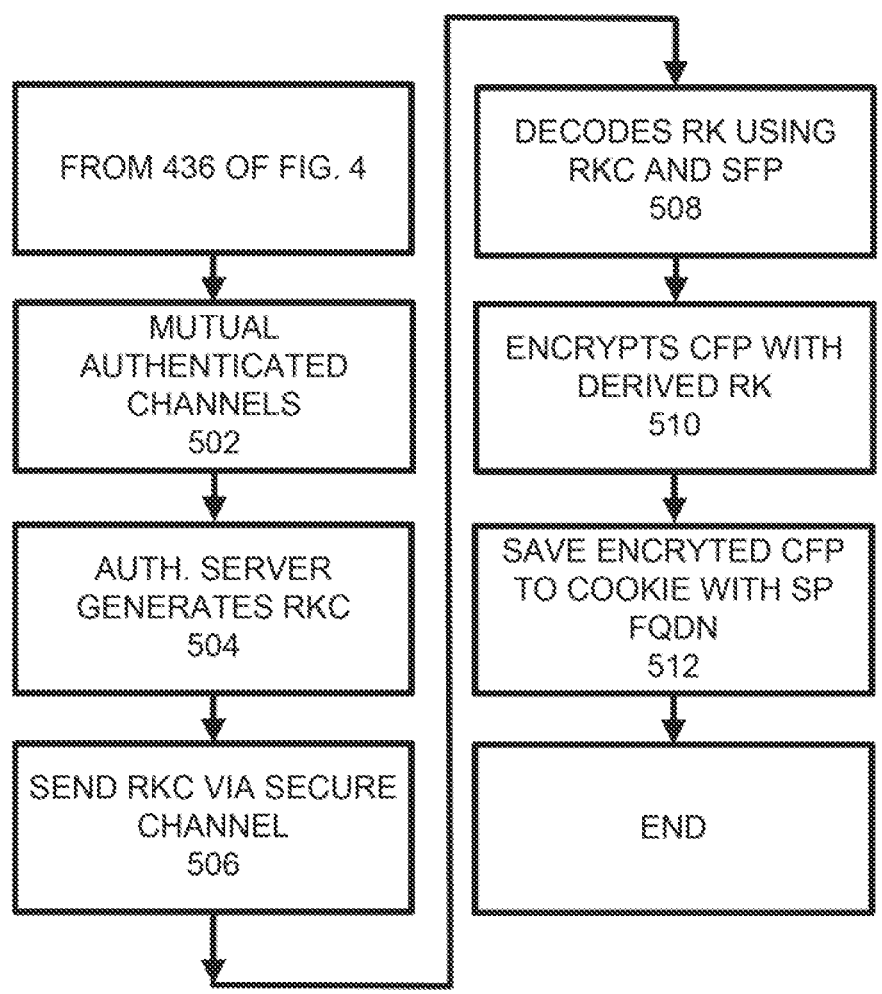
FIG. 5 shows, in accordance with embodiments of the invention, the post-authentication steps.

FIG. 5 shows, in accordance with embodiments of the invention, the post-authentication steps. In step 502, the mutual authentication channel is assumed to have been established from the mutual authentication stage. In step 504, the authentication server 110 generated the rolling key challenge (RKC). In step 506, the rolling key challenge is sent via the secure communication channel to service consumer browser 102. In step 508, service consumer browser 102 decodes the rolling key (RK) using the received RKC and the server fingerprint (SFP). In step 510, service consumer browser 102 encrypts the client fingerprint (CFP) with the decoded rolling key (RK). In this manner, the client fingerprint (CFP) is encoded with a different rolling key each session. In step 512, the encrypted CFP is saved to the secure cookie and is associated with the FQDN of the service provider server.

While this invention has been described in terms of several preferred embodiments, there are alterations, permutations, and equivalents, which fall within the scope of this invention. It should also be noted that there are many alternative ways of implementing the methods and apparatuses of the present invention. Although various examples are provided herein, it is intended that these examples be illustrative and not limiting with respect to the invention.

What is claimed is:

1. A computer-implemented method for authenticating a user using a service provider server and an authentication server, said user communicating with at least one of said service provider server and said authentication server using a user browser, comprising:
    requesting, using said user browser, said authenticating with said service provider server;
    authenticating, using said user browser, a secure communication channel with said authentication server;
    receiving, using said user browser, a Next Pre-Authentication Anchor (NPAA) value from said authentication server; and
    temporarily storing said Next Pre-Authentication Anchor (NPAA) value in a user browser cookie associated with said user browser, wherein said Next Pre-Authentication Anchor (NPAA) value is protected by employing Same Origin Policy (SOP).

2. The method of claim 1 wherein said secure communication channel is an encrypted channel that is encrypted using a challenge-response paradigm.

3. The method of claim 2 wherein said challenge-response paradigm is configured to establish a shared secret between said user browser and said authentication server, wherein said shared secret enables the establishment of said secure communication channel between said user browser and said authentication server.

4. The method of claim 3 wherein said shared secret includes a known fact.

5. The method of claim 1 further comprising obtaining, using said user browser, an IP address of said service provider server.

6. The method of claim 1 further comprising retrieving, using said user browser, said Next Pre-Authentication Anchor (NPAA) value from said user browser cookie.

7. The method of claim 1 further comprising setting, using said user browser, said Next Pre-Authentication Anchor (NPAA) value to said IP address of said service provider server.

8. The method of claim 1 further comprising redirecting said user browser to Fully Qualified Domain Name (FQDN) of said service provider server.

* * * * *